US012776829B2

(12) United States Patent
Shrestha et al.

(10) Patent No.: US 12,776,829 B2
(45) Date of Patent: Oct. 27, 2026

(54) DELAYING DOWNLINK CHANNEL MONITORING IN A NON-TERRESTRIAL NETWORK

(71) Applicant: QUALCOMM Incorporated, San Diego, CA (US)

(72) Inventors: Bharat Shrestha, San Diego, CA (US); Xiao Feng Wang, San Diego, CA (US); Umesh Phuyal, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 18/503,442

(22) Filed: Nov. 7, 2023

(65) Prior Publication Data

US 2025/0150160 A1 May 8, 2025

(51) Int. Cl.

| | |
|---|---|
| ***H04W 74/08*** | (2024.01) |
| ***H04B 7/185*** | (2006.01) |
| ***H04W 48/10*** | (2009.01) |
| ***H04W 74/0833*** | (2024.01) |

(52) U.S. Cl.

CPC ........ *H04B 7/18513* (2013.01); *H04W 48/10* (2013.01); *H04W 74/0833* (2013.01)

(58) Field of Classification Search

None

See application file for complete search history.

(56) References Cited

U.S. PATENT DOCUMENTS

| | | | | |
|---|---|---|---|---|
| 2021/0144581 | A1* | 5/2021 | Tripathi | H04W 8/26 |
| 2024/0049297 | A1* | 2/2024 | Khoshkholgh Dashtaki | H04B 7/18513 |
| 2024/0090045 | A1* | 3/2024 | Agiwal | H04W 74/0833 |
| 2024/0155725 | A1* | 5/2024 | Agiwal | H04W 76/27 |
| 2024/0162976 | A1* | 5/2024 | Ye | H04B 7/06964 |

* cited by examiner

*Primary Examiner* — Abdullahi Ahmed
*Assistant Examiner* — Ahmed Saifuddin
(74) *Attorney, Agent, or Firm* — Harrity & Harrity LLP/QUALCOMM Incorporated

(57) ABSTRACT

Various aspects of the present disclosure generally relate to wireless communication. In some aspects, a user equipment (UE) may transmit, to a distributed unit (DU) of a network node associated with a non-terrestrial network (NTN), an uplink transmission, wherein the DU is onboard a satellite and a central unit (CU) of the network node is on ground. The UE may receive, from the DU, a downlink transmission based at least in part on a delayed downlink channel monitoring window, wherein the delayed downlink channel monitoring window is based at least in part on a first time offset and a second time offset, the first time offset is associated with a UE-DU round-trip time (RTT), and the second time offset is associated with a CU-DU RTT. Numerous other aspects are described.

30 Claims, 11 Drawing Sheets

DELAYING DOWNLINK CHANNEL MONITORING IN A NON-TERRESTRIAL NETWORK

FIELD OF THE DISCLOSURE

Aspects of the present disclosure generally relate to wireless communication and to techniques and apparatuses for delaying downlink channel monitoring in a non-terrestrial network (NTN).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. “Downlink” (or “DL”) refers to a communication link from the network node to the UE, and “uplink” (or “UL”) refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes one or more memories; and one or more processors, coupled to the one or more memories, configured to cause the UE to: transmit, to a distributed unit (DU) of a network node associated with a non-terrestrial network (NTN), an uplink transmission, wherein the DU is onboard a satellite and a central unit (CU) of the network node is on ground; and receive, from the DU, a downlink transmission based at least in part on a delayed downlink channel monitoring window, wherein the delayed downlink channel monitoring window is based at least in part on a first time offset and a second time offset, the first time offset is associated with a UE-DU round-trip time (RTT), and the second time offset is associated with a CU-DU RTT.

In some implementations, an apparatus for wireless communication at a DU of a network node includes one or more memories; and one or more processors, coupled to the one or more memories, configured to cause the DU of the network node to: receive, from a UE, an uplink transmission, wherein the DU of the network node is associated with an NTN, and the DU is onboard a satellite and a CU of the network node is on ground; and transmit, to the UE, a downlink transmission, wherein a reception of the downlink transmission is based at least in part on a delayed downlink channel monitoring window, the delayed downlink channel monitoring window is based at least in part on a first time offset and a second time offset, the first time offset is associated with a UE-DU RTT, and the second time offset is associated with a CU-DU RTT.

In some implementations, a method of wireless communication performed by a UE includes transmitting, to a DU of a network node associated with an NTN, an uplink transmission, wherein the DU is onboard a satellite and a CU of the network node is on ground; and receiving, from the DU, a downlink transmission based at least in part on a delayed downlink channel monitoring window, wherein the delayed downlink channel monitoring window is based at least in part on a first time offset and a second time offset, the first time offset is associated with a UE-DU RTT, and the second time offset is associated with a CU-DU RTT.

In some implementations, a method of wireless communication performed by a DU of a network node includes receiving, from a UE, an uplink transmission, wherein the DU of the network node is associated with an NTN, and the DU is onboard a satellite and a CU of the network node is on ground; and transmitting, to the UE, a downlink transmission, wherein a reception of the downlink transmission is based at least in part on a delayed downlink channel monitoring window, the delayed downlink channel monitoring window is based at least in part on a first time offset and a second time offset, the first time offset is associated with a UE-DU RTT, and the second time offset is associated with a CU-DU RTT.

In some implementations, a non-transitory computer-readable medium storing a set of instructions for wireless communication includes one or more instructions that, when executed by one or more processors of a UE, cause the UE to: transmit, to a DU of a network node associated with an NTN, an uplink transmission, wherein the DU is onboard a satellite and a CU of the network node is on ground; and receive, from the DU, a downlink transmission based at least in part on a delayed downlink channel monitoring window, wherein the delayed downlink channel monitoring window is based at least in part on a first time offset and a second time offset, the first time offset is associated with a UE-DU RTT, and the second time offset is associated with a CU-DU RTT.

In some implementations, a non-transitory computer-readable medium storing a set of instructions for wireless communication includes one or more instructions that, when executed by one or more processors of a DU of a network node, cause the DU of the network node to: receive, from a UE, an uplink transmission, wherein the DU of the network node is associated with an NTN, and the DU is onboard a satellite and a CU of the network node is on ground; and transmit, to the UE, a downlink transmission, wherein a reception of the downlink transmission is based at least in part on a delayed downlink channel monitoring window, the delayed downlink channel monitoring window is based at least in part on a first time offset and a second time offset, the first time offset is associated with a UE-DU RTT, and the second time offset is associated with a CU-DU RTT.

In some implementations, an apparatus for wireless communication includes means for transmitting, to a DU of a network node associated with an NTN, an uplink transmission, wherein the DU is onboard a satellite and a CU of the network node is on ground; and means for receiving, from the DU, a downlink transmission based at least in part on a delayed downlink channel monitoring window, wherein the delayed downlink channel monitoring window is based at least in part on a first time offset and a second time offset, the first time offset is associated with an apparatus-DU RTT, and the second time offset is associated with a CU-DU RTT.

In some implementations, an apparatus of a network node for wireless communication includes means for receiving, from a UE, an uplink transmission, wherein the apparatus of the network node is associated with an NTN, and the apparatus is onboard a satellite and a CU of the network node is on ground; and means for transmitting, to the UE, a downlink transmission, wherein a reception of the downlink transmission is based at least in part on a delayed downlink channel monitoring window, the delayed downlink channel monitoring window is based at least in part on a first time offset and a second time offset, the first time offset is associated with a UE-apparatus RTT, and the second time offset is associated with a CU-apparatus RTT.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
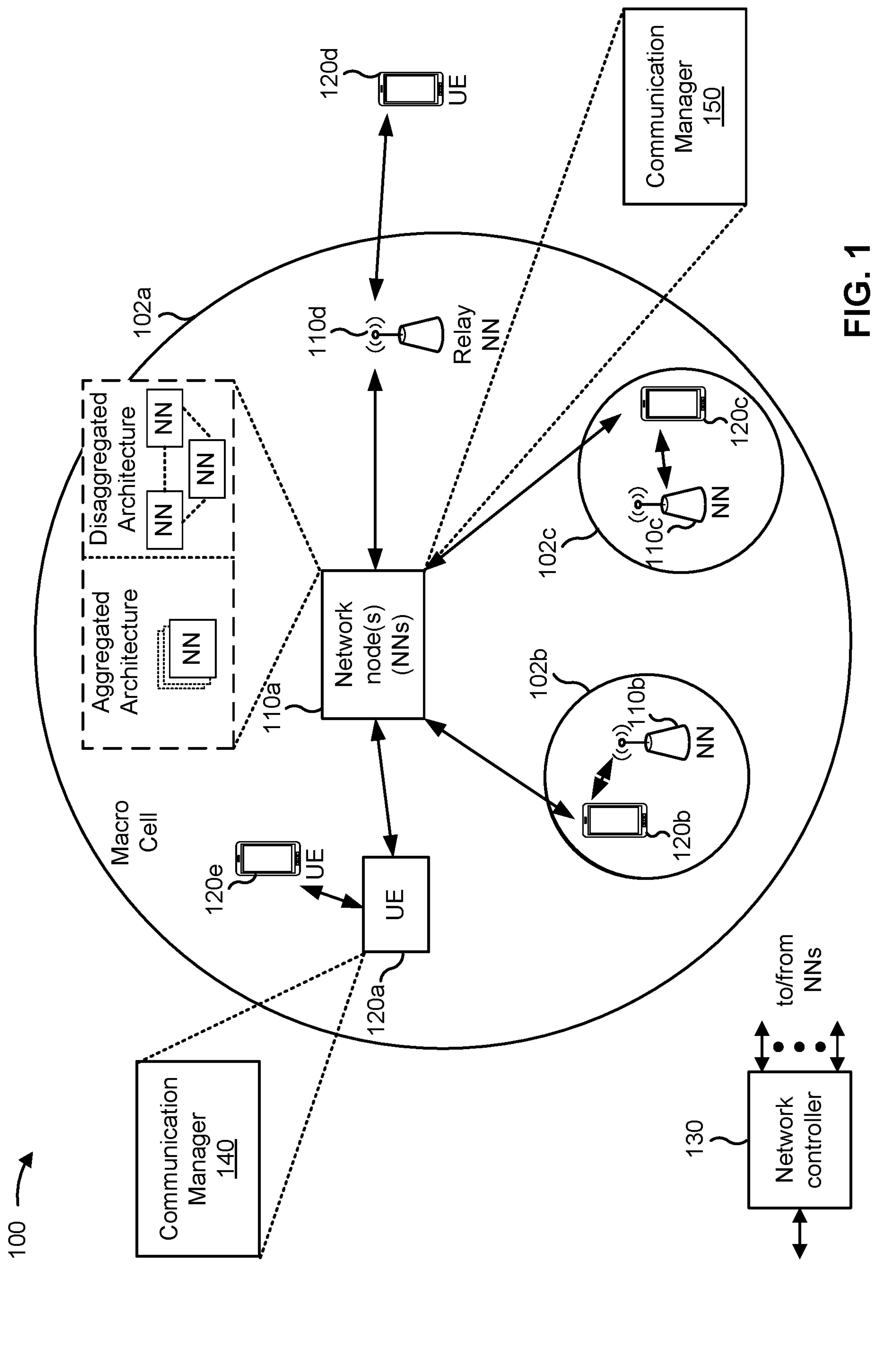
FIG. 1 is a diagram illustrating an example of a wireless network, in accordance with the present disclosure.

A non-terrestrial network (NTN) may be associated with a regenerative payload architecture. The regenerative payload architecture may be applicable to various use cases, such as store and forward in a non-feeder link scenario and local access or NTN backhaul. In the regenerative payload architecture, a distributed unit (DU) may be onboard a satellite, such as a serving satellite. The DU may be associated with a medium access control (MAC) layer and a radio link control (RLC) layer. A central unit (CU) may be on the ground. For example, the CU may be associated with a network node that is at ground level (e.g., not in the air or not in space). The CU may be associated with a packet data convergence protocol (PDCP) layer and a radio resource control (RRC) layer.

An NTN with a regenerative payload architecture may not reduce the delay for control plane signaling, such as RRC messages and PDCP retransmissions. Such control plane signaling may experience relatively long delay due to the split nature of the DU and the CU in the NTN with the regenerative payload architecture. The relatively long delay may be due to signals being received at the UE based at least in part on a round-trip time (RTT) between the UE and the DU plus an RTT between the DU and the CU. The UE may perform a physical downlink control channel (PDCCH) monitoring, and the relatively long delay may cause the UE to waste resources during the PDCCH monitoring. For example, the UE may receive a downlink signal from the DU. The UE may wait for a certain period of time and then start the PDCCH monitoring, with an expectation that the UE will receive another downlink signal from the DU. The certain period of time may be based at least in part on an RTT between the UE and a gNB (e.g., a UE-gNB RTT), which may only be applicable when both the DU and the CU are co-located (e.g., both the DU and the CU are on the ground gNB). When the DU is onboard the satellite and the CU is on the ground, this certain period of time may be insufficient. The UE may start the PDCCH monitoring, but the UE may still have to wait for an undue amount of time before another downlink signal is received from the DU due to an RTT between the DU and the CU. The DU and the CU may need to exchange signaling before the DU is able to transmit another downlink signal to the UE, and the UE may not account for this extra signaling delay before starting the PDCCH monitoring. As a result, the UE may prematurely start the PDCCH monitoring before any other downlink signal is transmitted by the DU, thereby wasting resources at the UE. Such premature PDCCH monitoring may unnecessarily waste power at the UE, thereby degrading an overall performance of the UE.

Various aspects relate generally to delaying downlink channel monitoring in an NTN. Some aspects more specifically relate to delaying a PDCCH monitoring in an NTN based at least in part on multiple time offsets. In some examples, a UE may transmit, to a DU of a network node associated with an NTN, an uplink transmission. The DU may be onboard a satellite. A CU of the network node may be on the ground. The UE may receive, from the DU, a downlink transmission based at least in part on a delayed downlink channel monitoring window. The UE may delay a downlink channel monitoring based at least in part on the delayed downlink channel monitoring window. The delayed downlink channel monitoring window may be based at least in part on a first time offset and a second time offset. The first time offset may be associated with a UE-DU RTT. The second time offset may be associated with a CU-DU RTT.

Particular aspects of the subject matter described in this disclosure can be implemented to realize one or more of the following potential advantages. In some examples, by delaying a downlink channel monitoring based at least in part on the delayed downlink channel monitoring window, the described techniques can be used to avoid the wastage of resources at the UE. The UE may not prematurely start monitoring a downlink channel, even when a downlink response is not yet possible due to the CU-DU RTT. In this case, the UE may enter a sleep mode to save power, and then the UE may start the downlink channel monitoring. The UE may not start the downlink channel monitoring before the downlink channel is expected, which may enable the UE to be in the sleep mode for a larger amount of time, thereby saving power at the UE. In some aspects, when the UE only performs the downlink channel monitoring using the delayed downlink channel monitoring window, the UE may save power, thereby improving an overall performance of the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more CUs, one or more DUs, or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1. FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may transmit, to a DU of a network node associated with an NTN, an uplink transmission, wherein the DU is onboard a satellite and a CU of the network node is on ground; and receive, from the DU, a downlink transmission based at least in part on a delayed downlink channel monitoring window, wherein the delayed downlink channel monitoring window is based at least in part on a first time offset and a second time offset, the first time offset is associated with a UE-DU RTT, and the second time offset is associated with a CU-DU RTT. Additionally, or alternatively, the communication manager 140 may perform one or more other operations described herein.

In some aspects, a DU of a network node (e.g., the network node 110) may include a communication manager 150. As described in more detail elsewhere herein, the communication manager 150 may receive, from a UE, an uplink transmission, wherein the DU of the network node is associated with an NTN, and the DU is onboard a satellite and a CU of the network node is on ground; and transmit, to the UE, a downlink transmission, wherein a reception of the downlink transmission is based at least in part on a delayed downlink channel monitoring window, the delayed downlink channel monitoring window is based at least in part on a first time offset and a second time offset, the first time offset is associated with a UE-DU RTT, and the second time offset is associated with a CU-DU RTT. Additionally, or alternatively, the communication manager 150 may perform one or more other operations described herein.

As indicated above, FIG. 1 is provided as an example. Other examples may differ from what is described with regard to FIG. 1.

Figure 2:
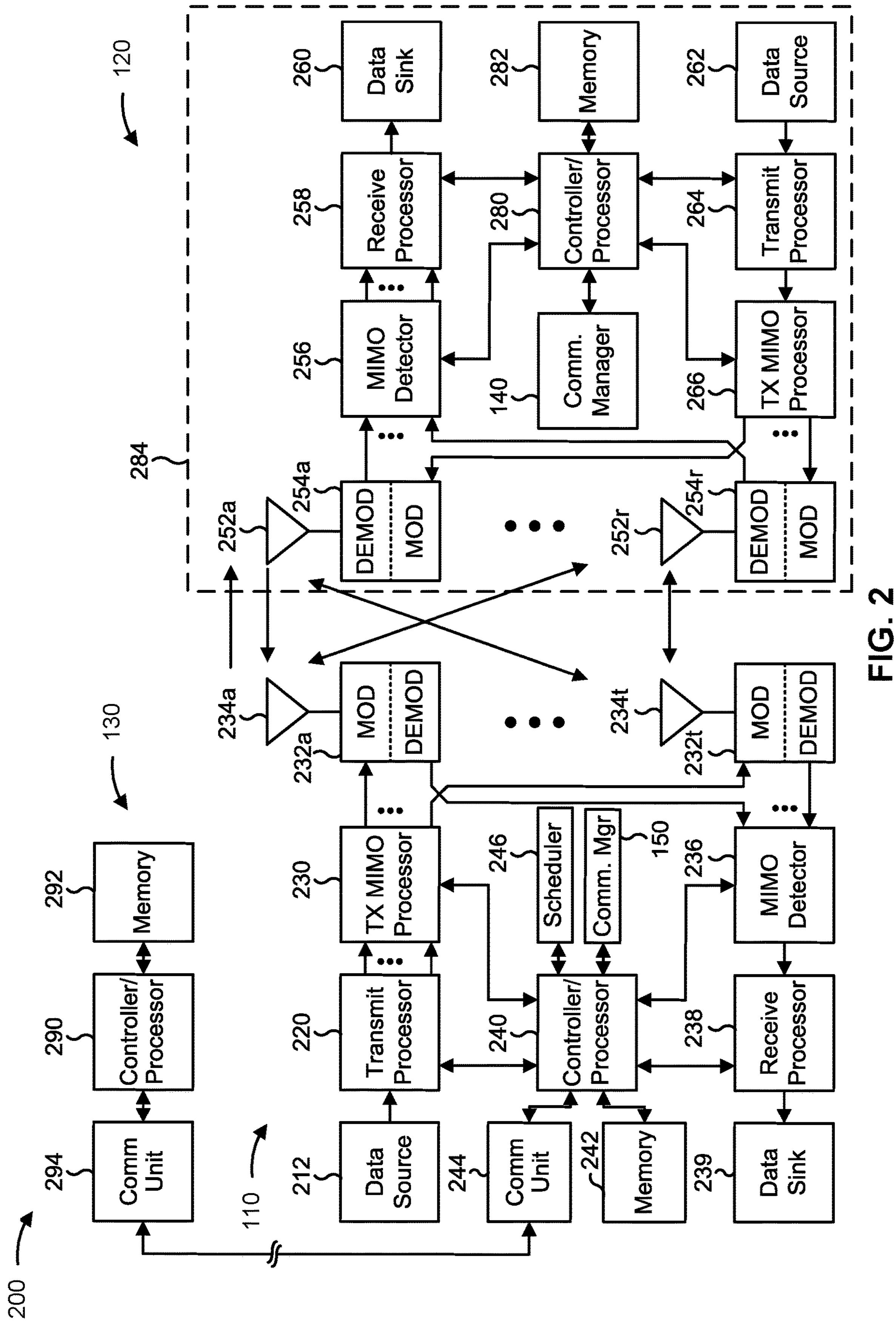
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the network node 110, the controller/processor 280 of the UE 120, and/or any other component(s) of FIG. 2 may perform one or more techniques associated with delaying downlink channel monitoring in an NTN, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting, to a DU of a network node associated with an NTN, an uplink transmission, wherein the DU is onboard a satellite and a CU of the network node is on ground (e.g., using controller/processor 280, transmit processor 264, TX MIMO processor 266, modem 254, antenna 252, memory 282, or the like); and/or means for receiving, from the DU, a downlink transmission based at least in part on a delayed downlink channel monitoring window, wherein the delayed downlink channel monitoring window is based at least in part on a first time offset and a second time offset, the first time offset is associated with a UE-DU RTT, and the second time offset is associated with a CU-DU RTT (e.g., using antenna 252, modem 254, MIMO detector 256, receive processor 258, controller/processor 280, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a DU of a network node (e.g., the network node 110) includes means for receiving, from a UE, an uplink transmission, wherein the DU of the network node is associated with an NTN, and the DU is onboard a satellite and a CU of the network node is on ground (e.g., using antenna 234, modem 232, MIMO detector 236, receive processor 238, controller/processor 240, memory 242, or the like); and/or means for transmitting, to the UE, a downlink transmission, wherein a reception of the downlink transmission is based at least in part on a delayed downlink channel monitoring window, the delayed downlink channel monitoring window is based at least in part on a first time offset and a second time offset, the first time offset is associated with a UE-DU RTT, and the second time offset is associated with a CU-DU RTT (e.g., using controller/processor 240, transmit processor 220, TX MIMO processor 230, modem 232, antenna 234, memory 242, or the like). In some aspects, the means for the DU of the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
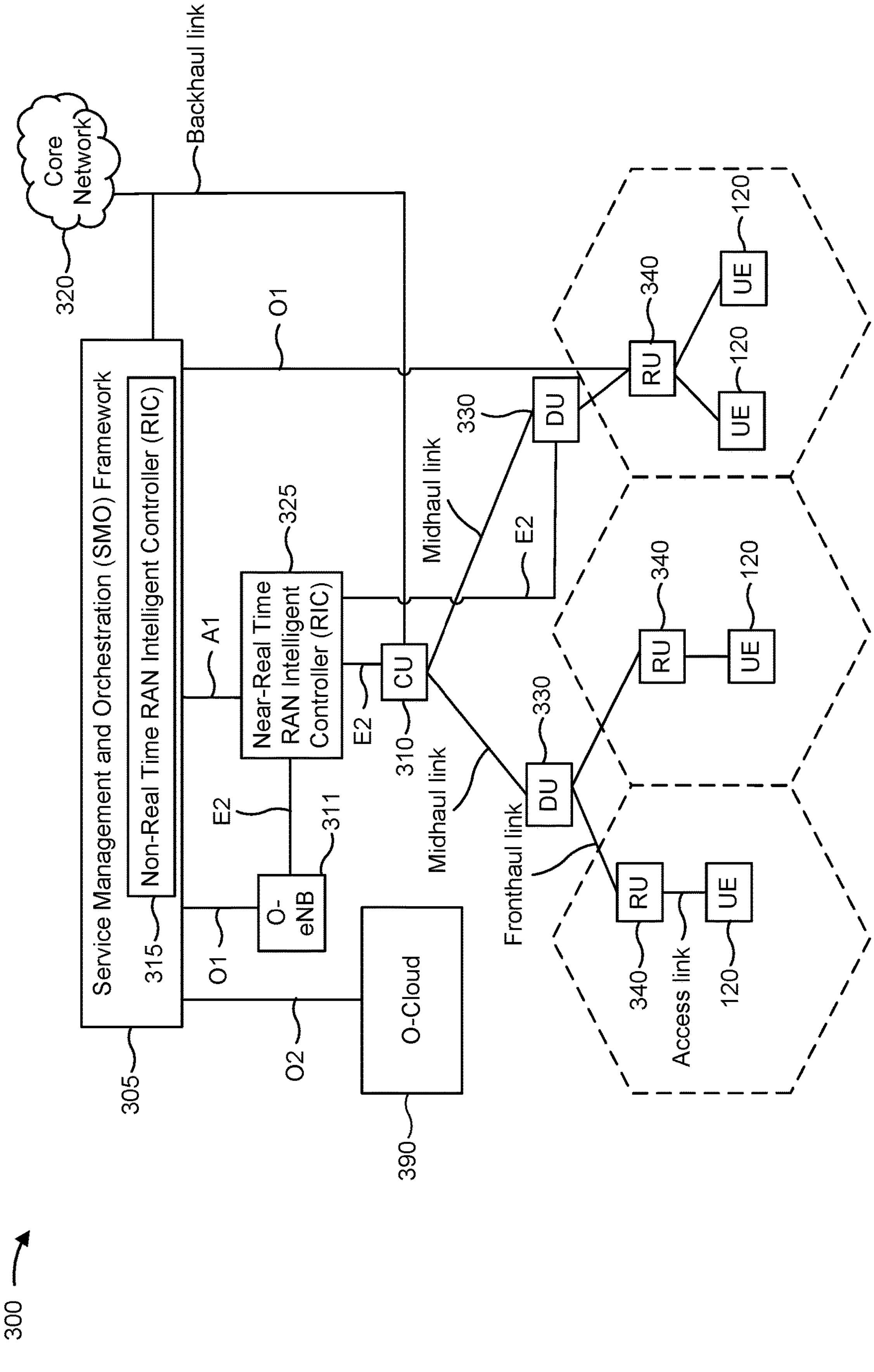
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include RRC functions, PDCP functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of an RLC layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

An NTN may be associated with a transparent payload architecture. In the transparent payload architecture, a UE may communicate with a serving gNB via a serving satellite in the NTN. The UE may transmit an uplink transmission to the serving satellite. The serving satellite may relay the uplink transmission to the serving gNB via a serving gateway. The serving gNB may transmit a downlink transmission to the serving satellite via the serving gateway. The serving satellite may relay the downlink transmission to the UE. A link between the UE and the serving satellite may be a service link, and a link between the serving satellite and the serving gateway may be feeder link.

An NTN may be associated with a regenerative payload architecture. The regenerative payload architecture may be applicable to various use cases, such as store and forward in a non-feeder link scenario and local access or NTN backhaul. In the regenerative payload architecture, a DU may be onboard a satellite, such as a serving satellite. The DU may be associated with a MAC layer and an RLC layer. A CU may be on the ground. The CU may be associated with a PDCP layer and an RRC layer.

Figure 4:
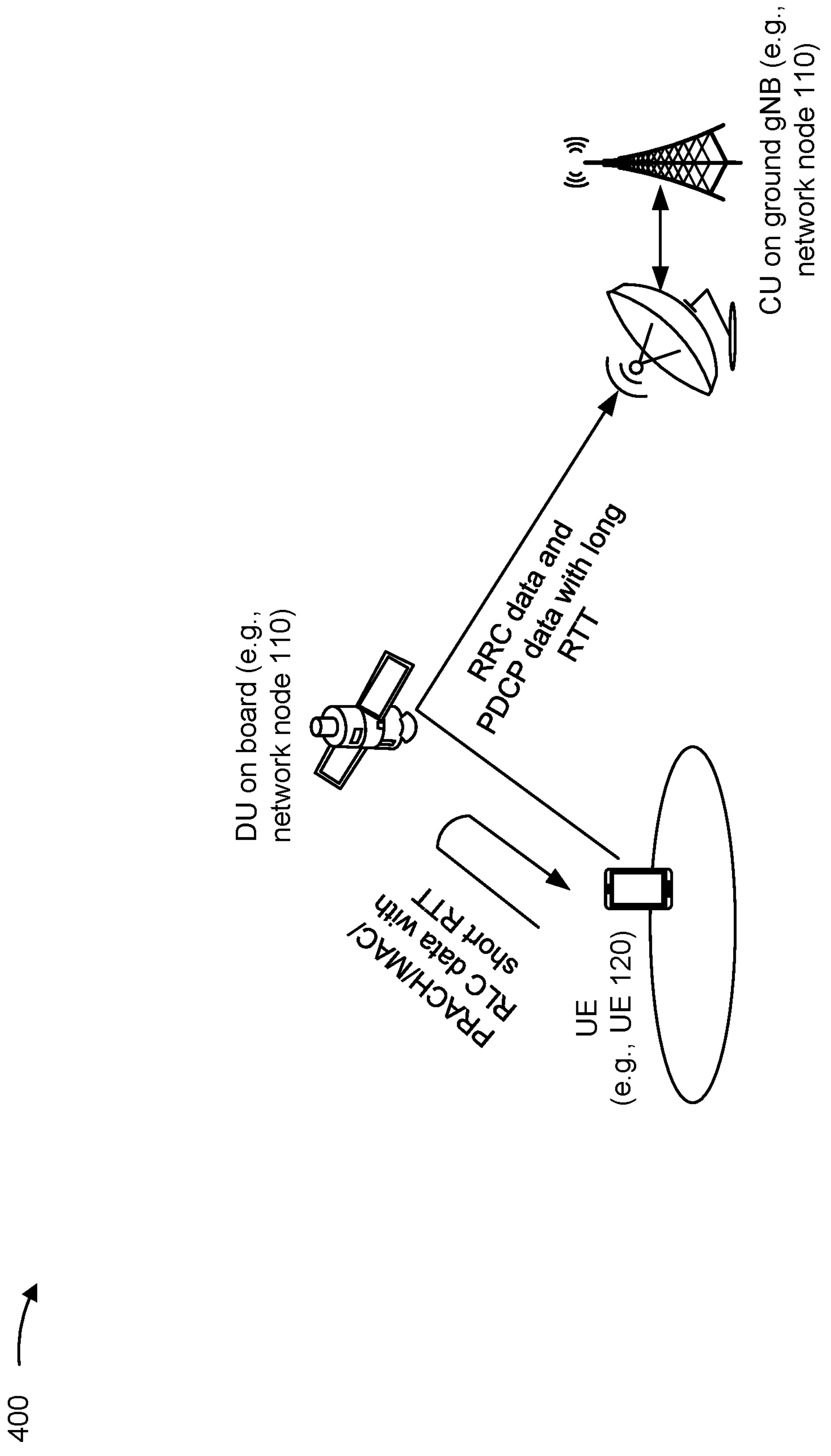
FIG. 4 is a diagram illustrating an example of a non-terrestrial network (NTN) with a regenerative payload architecture, in accordance with the present disclosure.

FIG. 4 is a diagram illustrating an example 400 of an NTN with a regenerative payload architecture, in accordance with the present disclosure.

As shown in FIG. 4, in an NTN with a regenerative payload architecture, a DU may be onboard a satellite. A CU may be on a ground gNB. A physical random access channel (PRACH) transmission, a MAC transmission, or an RLC transmission between a UE and the DU may be associated with a relatively short RTT. An RRC transmission or a PDCP transmission between the UE and the CU, via the DU, may be associated with a relatively long RTT.

As indicated above, FIG. 4 is provided as an example. Other examples may differ from what is described with regard to FIG. 4.

An NTN with a regenerative payload architecture may not reduce the delay for control plane signaling, such as RRC messages and PDCP retransmissions. Such control plane signaling may experience relatively long delay due to the split nature of a DU and a CU (e.g., the DU is onboard a satellite and the CU is on the ground) in the NTN with the regenerative payload architecture. The relatively long delay may be due to signals being received at the UE based at least in part on an RTT between the UE and the DU plus an RTT between the DU and the CU. The UE may perform a PDCCH monitoring, and the relatively long delay may cause the UE to waste resources during the PDCCH monitoring. For example, the UE may receive a downlink signal from the DU. The UE may wait for a certain period of time and then start the PDCCH monitoring, with an expectation that the UE will receive another downlink signal from the DU. The certain period of time may be based at least in part on an RTT between a UE and a gNB (e.g., a UE-gNB RTT), which may only be applicable when both the DU and the CU are co-located (e.g., both the DU and the CU are on the ground gNB). When the DU is onboard the satellite and the CU is on the ground, this certain period of time may be insufficient. The UE may start the PDCCH monitoring, but the UE may still have to wait for an undue amount of time before another downlink signal is received from the DU due to an RTT between the DU and the CU. The DU and the CU may need to exchange signaling before the DU is able to transmit another downlink signal to the UE, and the UE may not account for this extra signaling delay before starting the PDCCH monitoring. As a result, the UE may prematurely start the PDCCH monitoring before any other downlink signal is transmitted by the DU, thereby wasting resources at the UE. Such premature PDCCH monitoring may unnecessarily waste power at the UE, thereby degrading an overall performance of the UE.

In various aspects of techniques and apparatuses described herein, a UE may transmit, to a DU of a network node associated with an NTN, an uplink transmission. The DU may be onboard a satellite. A CU of the network node may be on the ground. The UE may receive, from the DU, a downlink transmission based at least in part on a delayed downlink channel monitoring window. The UE may delay a downlink channel monitoring based at least in part on the delayed downlink channel monitoring window. The delayed downlink channel monitoring window may be based at least in part on a first time offset and a second time offset. The first time offset may be associated with a UE-DU RTT. The second time offset may be associated with a CU-DU RTT.

In some aspects, a handling of MAC layer and RRC layer data scheduling may involve the use of two different RTTs or time offsets (Koffsets). A timer offset may be used differently for a data radio bearer (DRB) versus a signaling radio bearer (SRB). Two different RTTs for MAC layer data and RRC layer data may be defined for more power efficiency. Otherwise, the UE may waste power, for example, between receiving a MAC response (e.g., contention resolution identifier (ID) MAC control element (MAC-CE)) from the DU on the satellite and a message 4 (Msg4) RRC response from the CU on the ground, where the Msg4 RRC response may be part of a RACH procedure. For small data transmissions (SDT), multiple handshakes between the CU and the DU may cause multiple RTTs (wait times) before the UE is able to receive an RRC release in Msg4, so defining the two different RTTs may allow the UE to waste less power. In some aspects, by handling MAC layer and RRC layer data scheduling using the two different RTTs or offsets, and by handling multiple RTTs when only the DU is onboard the satellite (as opposed to the DU and the CU being co-located), the UE may avoid wasting power during PDCCH monitoring, thereby improving an overall performance of the UE.

Figure 5:
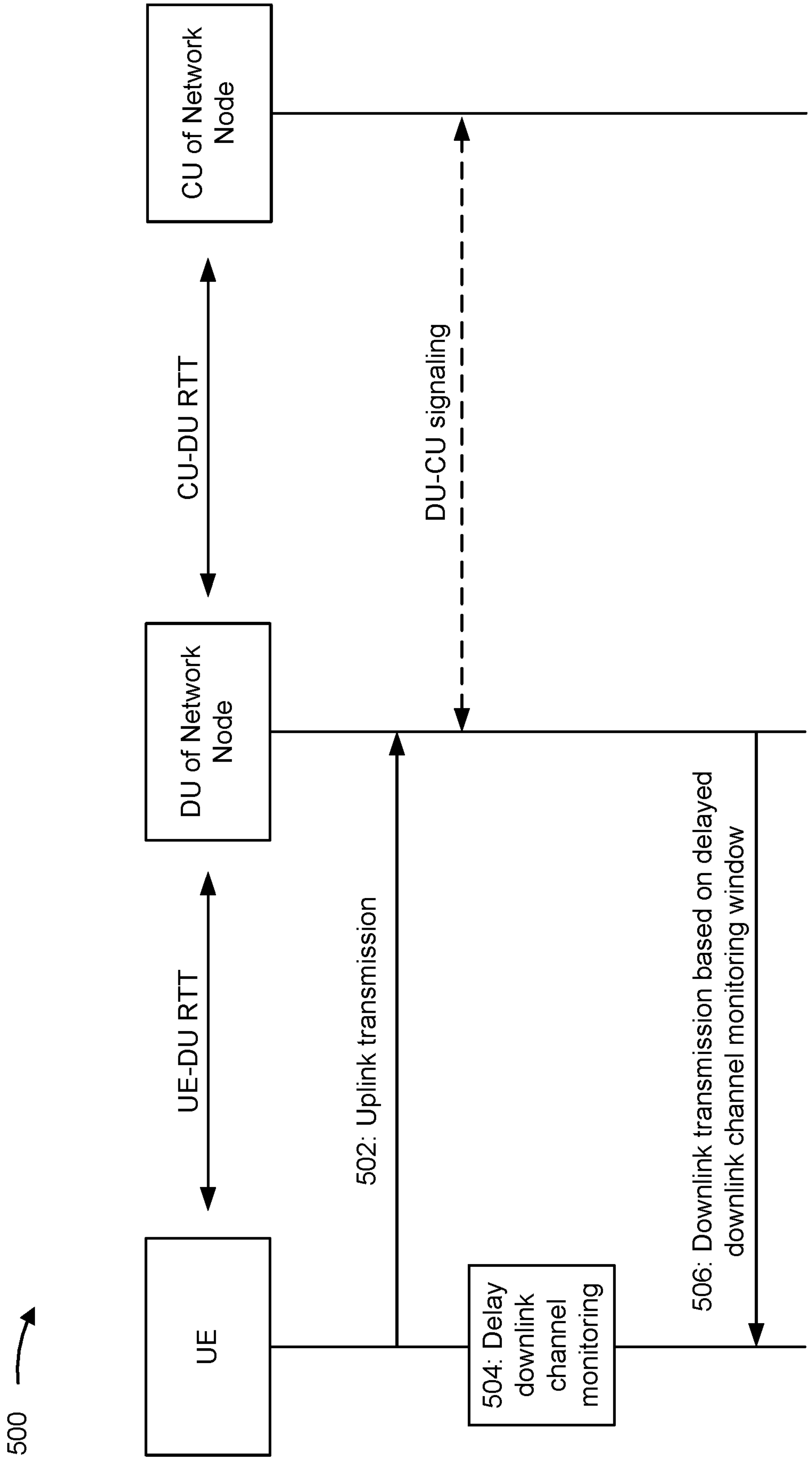
FIGS. 5-7 are diagrams illustrating examples associated with delaying downlink channel monitoring in an NTN, in accordance with the present disclosure.

FIG. 5 is a diagram illustrating an example 500 associated with delaying downlink channel monitoring in an NTN, in accordance with the present disclosure. As shown in FIG. 5, example 500 includes communication between a UE (e.g., UE 120), a DU (e.g., network node 110), and a CU (e.g., network node 110). In some aspects, the UE, the CU, and the DU may be included in a wireless network, such as wireless network 100.

In some aspects, the CU and the DU may be associated with a network node, where the network node may be associated with an NTN. For example, the DU may be onboard a satellite and the DU may be on the ground.

As shown by reference number 502, the UE may transmit, to the DU, an uplink transmission. The uplink transmission may be associated with a half of a UE-DU RTT. As an example, the uplink transmission may be associated with a RACH procedure, or the uplink transmission may be associated with an SDT. The DU may exchange signaling with the CU based at least in part on the uplink transmission by the UE.

As shown by reference number 504, the UE may delay a downlink channel monitoring in accordance with a delayed downlink channel monitoring window. The delayed downlink channel monitoring window may be based at least in part on a first time offset and a second time offset. The first time offset may be associated with a UE-DU RTT. The second time offset may be associated with a CU-DU RTT. The CU-DU RTT may be associated with the signaling exchanged between the DU and the CU. In some aspects, the UE may receive, via a broadcast, a SIB that includes an indication of the CU-DU RTT.

As shown by reference number 506, the UE may receive, from the DU, a downlink transmission based at least in part on the delayed downlink channel monitoring window. The downlink transmission may be associated with the other half of the UE-DU RTT. As an example, the downlink transmission may be associated with the RACH procedure, or the downlink transmission may be associated with the SDT.

Figure 6:
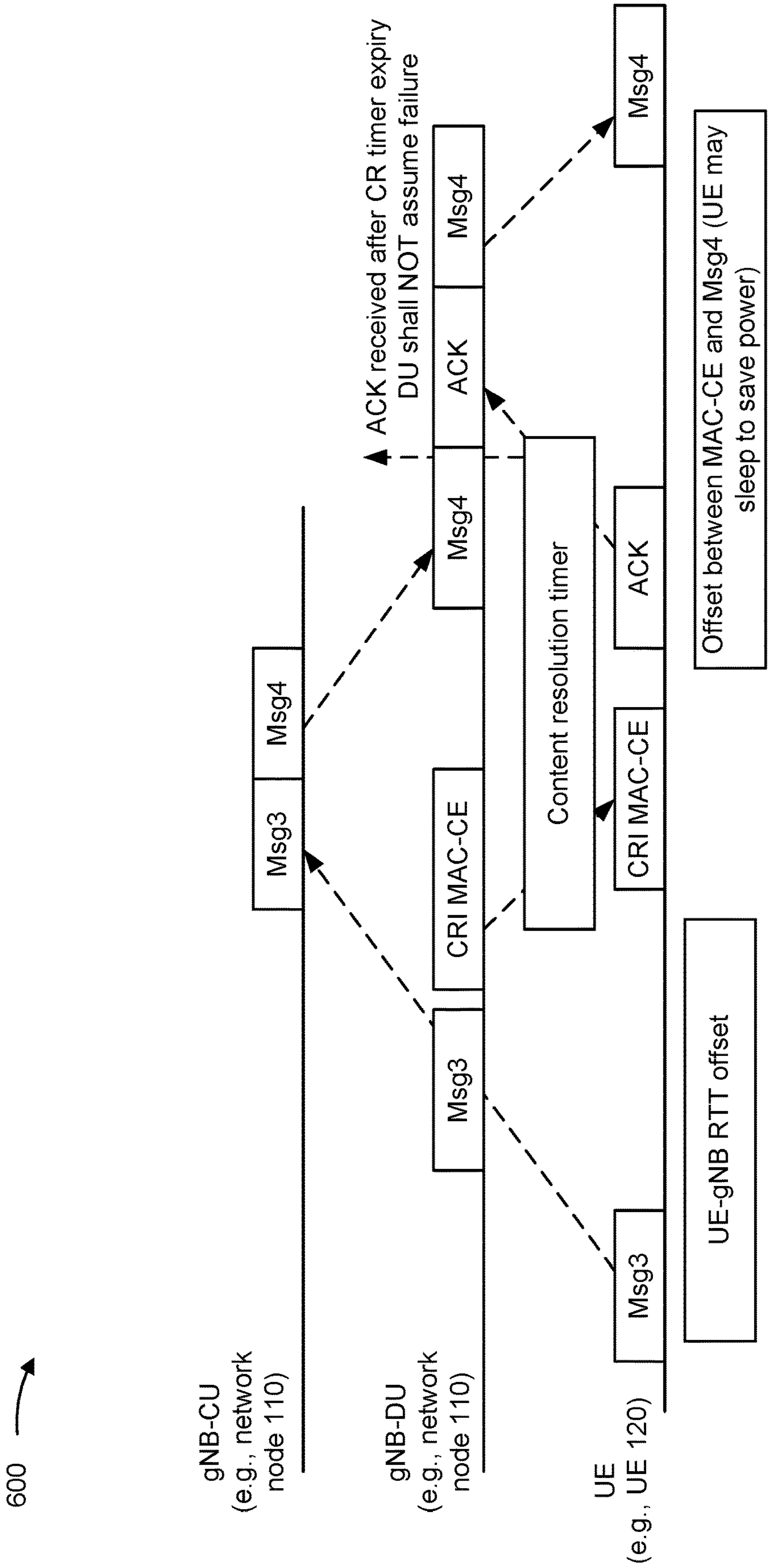

In some aspects, the uplink transmission may be a message 3 (Msg3) of the RACH procedure, and the downlink transmission may be a Msg4 of the RACH procedure (e.g., as shown in FIG. 6). In some aspects, the UE may delay a Msg4 RRC monitoring by the CU-DU RTT in accordance with the delayed downlink channel monitoring window. The Msg4 RRC monitoring may be delayed by the CU-DU RTT after an end of a reception of a contention resolution identifier MAC-CE, or the Msg4 RRC monitoring may be delayed by the CU-DU RTT after an end of a transmission of an acknowledgement (ACK) associated with the contention resolution identifier MAC-CE. In some aspects, the UE may delay a Msg4 RRC monitoring by a UE-CU RTT in accordance with the delayed downlink channel monitoring window. The Msg4 RRC monitoring may be delayed by the UE-CU RTT after an end of a Msg3 transmission. The UE-CU RTT may be the UE-DU RTT plus the CU-DU RTT.

In some aspects, the uplink transmission may be a message A (MsgA) of the RACH procedure, and the downlink transmission may be a message B (MsgB) of the RACH procedure. The UE may delay a downlink channel monitoring by the CU-DU RTT in accordance with the delayed downlink channel monitoring window based at least in part on the RACH procedure being successful. The downlink channel monitoring may be delayed for an initial access in which the UE is in an idle mode, an RRC reestablishment, or during a handover in which an RRC reconfiguration message is transmitted in the MsgA. The downlink channel monitoring may be delayed by the CU-DU RTT after an end of a reception of a downlink shared channel transmission in the MsgB, or the downlink channel monitoring may be delayed by the CU-DU RTT after an end of a reception of a success random access response (RAR) in the MsgB. In some aspects, the downlink channel monitoring may be delayed by the CU-DU RTT after an end of a transmission of an ACK associated with a success RAR in the MsgB.

Figure 7:
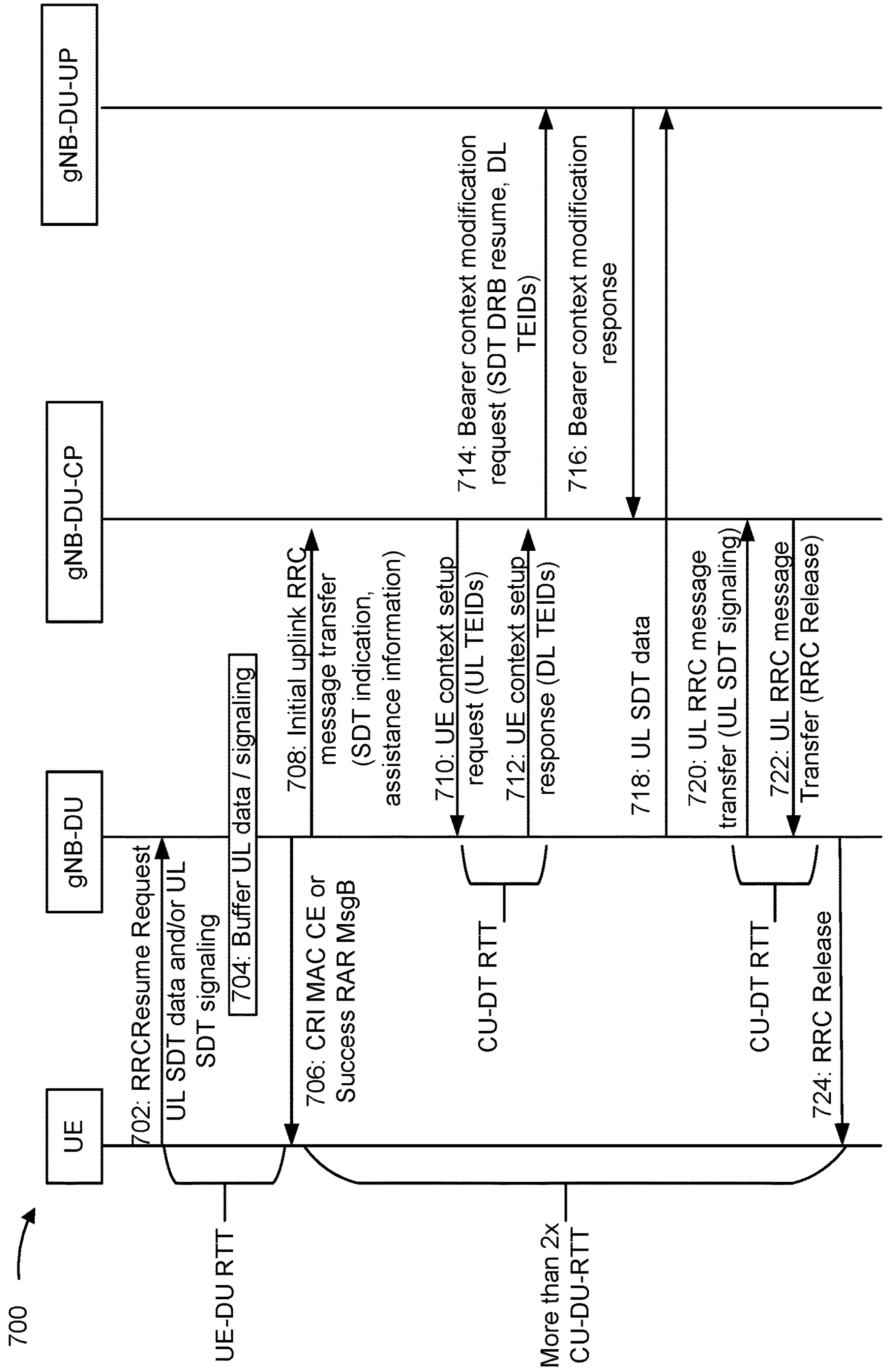

In some aspects, the uplink transmission may be an RRC resume request message associated with an SDT, and the downlink transmission may be an RRC release message (e.g., as shown in FIG. 7). The UE may delay a downlink channel monitoring by a CU-DU RTT associated with the SDT, where the CU-DU RTT associated with the SDT may be at least twice a time duration of a CU-DU RTT associated with a non-SDT. The UE may receive, via a broadcast, a SIB that includes an indication of the CU-DU RTT associated with the SDT. The downlink channel monitoring may be delayed by the CU-DU RTT associated with the SDT after an end of a reception of a contention resolution identifier MAC-CE, or the downlink channel monitoring may be delayed by the CU-DU RTT associated with the SDT after an end of a reception of a success RAR in a MsgB of a RACH procedure.

In some aspects, the uplink transmission may be a preconfigured uplink resource (PUR) based transmission. The downlink transmission may be a layer 1 (L1) ACK. A downlink channel monitoring for a downlink RRC message may be delayed by the CU-DU RTT after an end of a reception of the L1 ACK in accordance with the delayed downlink channel monitoring window.

As indicated above, FIG. 5 is provided as an example. Other examples may differ from what is described with regard to FIG. 5.

During a random access procedure, an RAR window and a contention resolution window may be delayed by a UE-gNB RTT. When a DU is onboard a satellite and a CU is on a ground gNB, the UE-gNB RTT may become a UE-DU RTT. Delaying the RAR window and the contention resolution window by the UE-DU RTT may only provide power savings for a gap between a UE Msg3 transmission and a contention resolution ID MAC-CE reception. However, the UE may still waste power between the contention resolution ID MAC-CE reception and a Msg4 RRC message reception, which may be due to the UE continuing to monitor a PDCCH for a next Msg4 reception after receiving the contention resolution ID MAC-CE.

FIG. 6 is a diagram illustrating an example 600 associated with delaying downlink channel monitoring in an NTN, in accordance with the present disclosure. As shown in FIG. 6, example 600 includes communication between a UE (e.g., UE 120), a gNB-DU (e.g., network node 110), and a gNB-CU (e.g., network node 110). In some aspects, the UE, the gNB-DU, and the gNB-CU may be included in a wireless network, such as wireless network 100.

In some aspects, a CU-DU RTT may be defined, which may correspond to an RTT between a CU on a ground gNB and a DU onboard a satellite. The CU-DU RTT may be associated with a feeder link RTT offset. The CU-DU RTT may be defined in addition to a UE-DU RTT, which may correspond to an RTT between a UE and the DU onboard the satellite. An indication of the CU-DU RTT may be broadcast via a system information block type 1 (SIB1) or a system information block type 19 (SIB19). A common timing advance (TA) and a scheduling offset ($K_{mac}$) may be set to zero (e.g., not broadcast in a cell). The UE may delay a PDCCH monitoring window based at least in part on the CU-DU RTT, which may save resources at the UE.

As shown in FIG. 6, the UE may transmit a Msg3 to the gNB-DU. The gNB-DU may relay the Msg3 to the gNB-CU. The gNB-DU may transmit a contention resolution ID (CRI) MAC-CE to the UE. The UE may perform a PDCCH monitoring based at least in part on a UE-gNB RTT offset. In other words, after the UE-gNB RTT offset, the UE may start the PDCCH monitoring, which may allow the UE to receive the contention resolution ID MAC-CE from the gNB-DU. The UE may receive the contention resolution ID MAC-CE when a contention resolution timer is running. The UE may transmit, based at least in part on a receipt of the contention resolution ID MAC-CE, an ACK (or hybrid automatic repeat request (HARQ) ACK) to the gNB-DU. The UE may transmit the ACK when the contention resolution timer is running. When the gNB-DU receives the ACK after an expiry of the contention resolution timer, the gNB-DU may not assume failure.

In some aspects, after transmitting the ACK, the UE may enter a sleep mode to save power. The UE may be in the sleep mode for a period of time, which may be based at least in part on a CU-DU RTT. In other words, after transmitting the ACK, the UE may not expect to receive another downlink signal from the gNB-DU for the period of time. In some aspects, the gNB-CU may receive the Msg3 from the gNB-DU, and the gNB-CU may transmit a Msg4 to the gNB-DU. The gNB-DU may receive the Msg4 from the gNB-CU. The gNB-CU may relay the Msg4 to the UE. The UE may wake up from the sleep mode and resume a PDCCH monitoring in order to receive the Msg4 from the gNB-DU. By entering the sleep mode after transmitting the ACK and before receiving the Msg4, the UE may save power. The UE may account for additional time needed for the Msg3 to be transmitted by the gNB-DU to the gNB-CU, and the additional time needed for the Msg4 to be transmitted by the gNB-CU to the gNB-DU, which may correspond to the CU-DU RTT. During this time, the UE may not unnecessarily monitor the PDCCH, which may allow the UE to save power.

In some aspects, the UE may delay a Msg4 RRC monitoring by the CU-DU RTT. The UE may delay the Msg4 RRC monitoring after an end of a reception of the contention resolution ID MAC-CE, or alternatively, the UE may delay the Msg4 RRC monitoring after an end of a transmission of the ACK associated with the contention resolution ID MAC-CE. In some aspects, the UE may delay the Msg4 RRC monitoring by a UE-CU RTT. The UE-CU RTT may equal the UE-gNB RTT (or UE-to-DU RTT) plus the CU-DU RTT. The UE may delay the Msg4 RRC monitoring after an end of a Msg3 transmission by the UE. The contention resolution timer may still be delayed by the UE-gNB RTT (or UE-to-DU RTT) after the end of the Msg3 transmission. When the UE is in an RRC connected mode, the UE may not delay the PDCCH monitoring by the CU-DU RTT.

As indicated above, FIG. 6 is provided as an example. Other examples may differ from what is described with regard to FIG. 6.

In a two-step RACH procedure, a MsgB window may be delayed by a UE-gNB RTT. When a DU is onboard a satellite, the UE-gNB RTT may become a UE-DU RTT.

In some aspects, for an initial access (e.g., for a UE in idle mode), an RRC reestablishment, or a handover while sending an RRC reconfiguration message in MsgA, a PDCCH monitoring may be delayed by a CU-DU RTT after a RACH is successful. The UE may delay the PDCCH monitoring by the CU-DU RTT after an end of a reception of a MsgB physical downlink shared channel (PDSCH) transmission or after an end of a reception of a success RAR message. In this case, the UE may be waiting for a downlink RRC response message that may arrive only after the CU-DU RTT. Alternatively, the UE may delay the PDCCH monitoring by the CU-DU RTT after an end of a transmission of an ACK associated with the success RAR message.

FIG. 7 is a diagram illustrating an example 700 associated with delaying downlink channel monitoring in an NTN, in accordance with the present disclosure. As shown in FIG. 7, example 700 includes communication between a UE (e.g., UE 120), a gNB-DU (e.g., network node 110), a gNB-CU control plane (gNB-CU-CP) (e.g., network node 110), and a gNB-CU user plane (gNB-CU-UP) (e.g., network node 110). In some aspects, the UE, the gNB-DU, the gNB-CU-CP, and the gNB-CU-UP may be included in a wireless network, such as wireless network 100.

In the case of SDTs, multiple handshakes may need to occur between a DU and a CU, which may incur more than twice a DU-CU RTT for a UE to receive an RRC release message.

In some aspects, in the case of an SDT, the UE may delay a PDCCH monitoring by at least twice the DU-CU RTT (and in some cases, longer than two times the DU-CU RTT). An indication of a CU-DU RTT for the SDT (e.g., a new offset of CU-DU-SDT-RTT) may be broadcast in a SIB. The CU-DU RTT for the SDT may be at least twice the DU-CU RTT (which may be associated with a non-SDT). The UE may delay the PDCCH monitoring after an end of a reception of a contention resolution ID MAC-CE or after an end of a reception of a success RAR message in MsgB. When the UE transmits an ACK in response to the MsgB or in response to a Msg4, the UE may delay the PDCCH monitoring after an end of a transmission of the ACK.

As shown by reference number 702, the UE may transmit an RRC resume request to the gNB-DU. The RRC resume request may be associated with uplink SDT data and/or uplink SDT signaling. As shown by reference number 704, the gNB-DU may buffer uplink data/signaling. As shown by reference number 706, the gNB-DU may transmit, to the UE, a contention resolution ID MAC-CE or a success RAR message in a MsgB. A transmission of the RRC resume request and a reception of the contention resolution ID MAC-CE or the success RAR message in the MsgB may be associated with a UE-DU RTT.

As shown by reference number 708, the gNB-DU may transmit, to the gNB-CU-CP, an initial uplink RRC message transfer, which may be associated with an SDT indication and assistance information. As shown by reference number 710, the gNB-CU-CP may transmit, to the gNB-DU, a UE context setup request, which may indicate one or more uplink tunnel endpoint identifiers (TEIDs). As shown by reference number 712, the gNB-DU may transmit, to the gNB-CU-CP, a UE context setup response, which may indicate one or more downlink TEIDs. A receipt of the UE context setup request and a transmission of the UE context setup response may be associated with a CU-DU RTT.

As shown by reference number 714, the gNB-CU-CP may transmit, to the gNB-CU-UP, a bearer context modification request, which may indicate an SDT DRB resume and one or more downlink TEIDs. As shown by reference number 716, the gNB-CU-CP may receive, from the gNB-CU-UP, a bearer context modification response. As shown by reference number 718, the gNB-DU may transmit, to the gNB-CU-UP, uplink SDT data.

As shown by reference number 720, the gNB-DU may transmit, to the gNB-CU-CP, an uplink RRC message transfer, which may indicate uplink SDT signaling. As shown by reference number 722, the gNB-CU-CP may transmit, to the gNB-DU, an uplink RRC message transfer, which may indicate an RRC release. A transmission of the uplink RRC message transfer and a receipt of the uplink RRC message transfer may be associated with a CU-DU RTT. As shown by reference number 724, the gNB-DU may transmit, to the UE, an RRC release message.

In some aspects, in the case of SDT, a receipt of the contention resolution ID MAC-CE or the success RAR message in the MsgB, and a receipt of the RRC release message, may be associated with more than twice the CU-DU RTT. The UE may delay a PDCCH monitoring after the receipt of the contention resolution ID MAC-CE or the success RAR message in the MsgB. The UE may delay the PDCCH monitoring by at least twice the CU-DU RTT, after which the UE may resume the PDCCH monitoring in order to receive the RRC release message.

As indicated above, FIG. 7 is provided as an example. Other examples may differ from what is described with regard to FIG. 7.

A UE may perform an uplink transmission using a PUR. When a UE is in idle mode, a network node may provide the PUR to the UE. In an IoT NTN, a PUR response window may be delayed by a UE-eNB RTT.

In some aspects, when a DU is onboard a satellite and a CU is on a ground gNB, an L1 ACK from the DU/CU may indicate whether the UE is to wait for a downlink RRC message. The L1 ACK may be transmitted by the DU to the UE. The UE may delay a PDCCH monitoring for the downlink RRC message by a CU-DU RTT after an end of a reception of the L1 ACK.

In some aspects, the UE may transmit, to the DU, a Msg3 during a RACH procedure. The UE may receive, from the DU, a contention resolution identifier MAC-CE. The UE may start a downlink channel monitoring after a reception of the contention resolution identifier MAC-CE or at an end of an ACK transmission. The downlink channel monitoring may be associated with a selected search space periodicity or a selected discontinuous reception (DRX) cycle to reduce power consumption at the UE. The downlink channel monitoring may not be associated with the CU-DU RTT.

In some aspects, no offset for the CU-DU RTT may be defined. After a reception of a contention resolution ID MAC-CE or at an end of an ACK transmission, the UE may start monitoring a PDCCH using a different search space periodicity or using a mini-DRX cycle to save power. In this case, the DU may transmit a Msg4 RRC message before the DU receives an ACK associated with the contention resolution ID MAC-CE. The Msg4 RRC message may be associated with a blind Msg4 transmission. When the DU does not receive the ACK of the contention resolution ID MAC-CE after one RTT, the DU may retransmit the contention resolution ID MAC-CE and the Msg4 RRC message together to the UE. When the UE was waiting for the contention resolution ID MAC-CE but received the Msg4 RRC message, the UE may discard the Msg4 RRC message.

Figure 8:
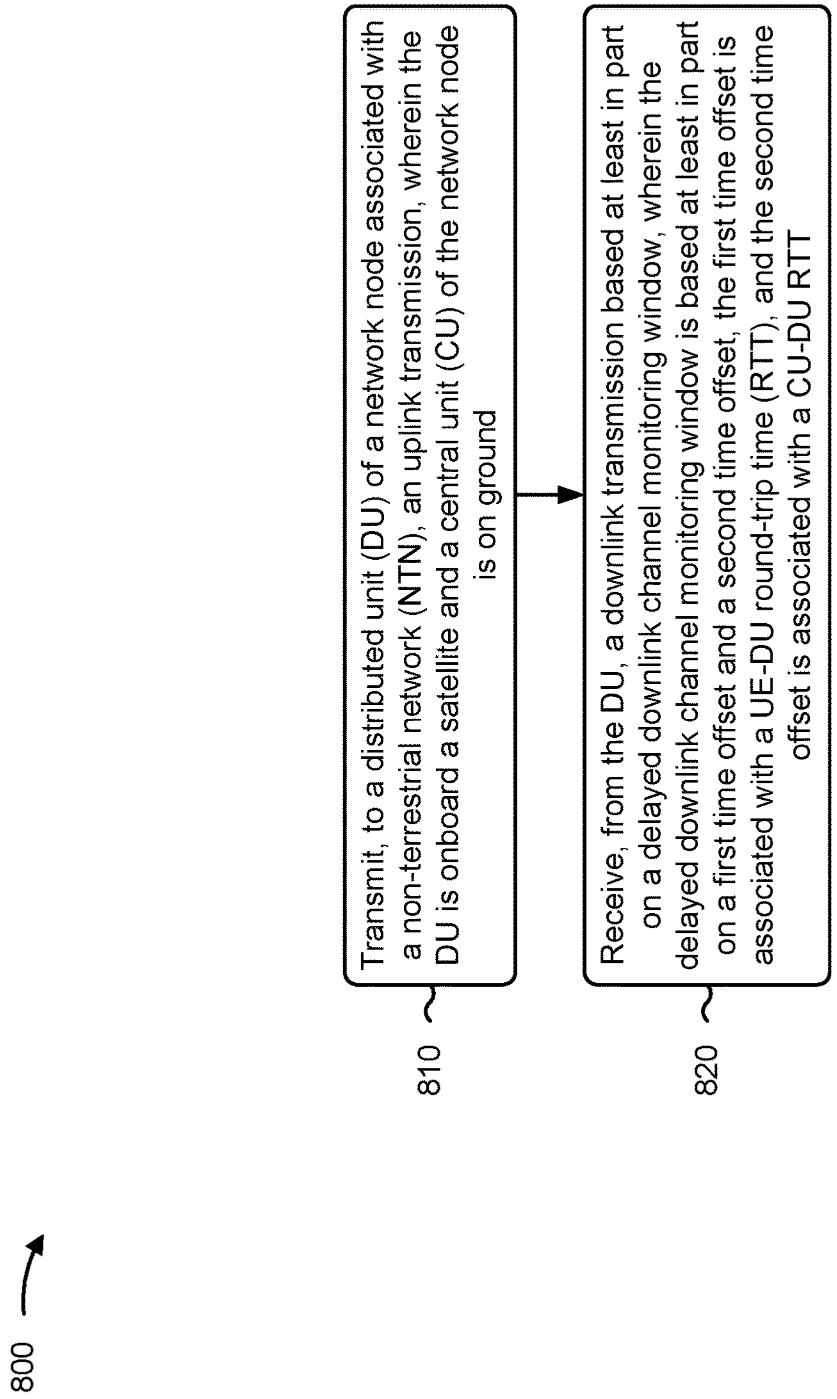
FIGS. 8-9 are diagrams illustrating example processes associated with delaying downlink channel monitoring in an NTN, in accordance with the present disclosure.

FIG. 8 is a diagram illustrating an example process 800 performed, for example, at a UE or an apparatus of a UE, in accordance with the present disclosure. Example process 800 is an example where the apparatus or the UE (e.g., UE 120) performs operations associated with delaying downlink channel monitoring in an NTN.

As shown in FIG. 8, in some aspects, process 800 may include transmitting, to a DU of a network node associated with an NTN, an uplink transmission, wherein the DU is onboard a satellite and a CU of the network node is on ground (block 810). For example, the UE (e.g., using communication manager 140 and/or transmission component 1004, depicted in FIG. 10) may transmit, to a DU of a network node associated with an NTN, an uplink transmission, wherein the DU is onboard a satellite and a CU of the network node is on ground, as described above, for example, with reference to FIGS. 5, 6, and/or 7.

As further shown in FIG. 8, in some aspects, process 800 may include receiving, from the DU, a downlink transmission based at least in part on a delayed downlink channel monitoring window, wherein the delayed downlink channel monitoring window is based at least in part on a first time offset and a second time offset, the first time offset is associated with a UE-DU RTT, and the second time offset is associated with a CU-DU RTT (block 820). For example, the UE (e.g., using communication manager 140 and/or reception component 1002, depicted in FIG. 10) may receive, from the DU, a downlink transmission based at least in part on a delayed downlink channel monitoring window, wherein the delayed downlink channel monitoring window is based at least in part on a first time offset and a second time offset, the first time offset is associated with a UE-DU RTT, and the second time offset is associated with a CU-DU RTT, as described above, for example, with reference to FIGS. 5, 6, and/or 7.

Process 800 may include additional aspects, such as any single aspect or any combination of aspects described below and/or in connection with one or more other processes described elsewhere herein.

In a first aspect, process 800 includes receiving, via a broadcast, a SIB that includes an indication of the CU-DU RTT.

In a second aspect, alone or in combination with the first aspect, the uplink transmission is a Msg3 of a RACH procedure, and the downlink transmission is a Msg4 of the RACH procedure.

In a third aspect, alone or in combination with one or more of the first and second aspects, process 800 includes delaying a Msg4 RRC monitoring by the CU-DU RTT in accordance with the delayed downlink channel monitoring window, wherein the Msg4 RRC monitoring is delayed by the CU-DU RTT after an end of a reception of a contention resolution identifier MAC-CE, or the Msg4 RRC monitoring is delayed by the CU-DU RTT after an end of a transmission of an ACK associated with the contention resolution identifier MAC-CE.

In a fourth aspect, alone or in combination with one or more of the first through third aspects, process 800 includes delaying a Msg4 RRC monitoring by a UE-CU RTT in accordance with the delayed downlink channel monitoring window, wherein the Msg4 RRC monitoring is delayed by the UE-CU RTT after an end of a Msg3 transmission, and the UE-CU RTT is the UE-DU RTT plus the CU-DU RTT.

In a fifth aspect, alone or in combination with one or more of the first through fourth aspects, the uplink transmission is a MsgA of a RACH procedure, and the downlink transmission is a MsgB of the RACH procedure.

In a sixth aspect, alone or in combination with one or more of the first through fifth aspects, process 800 includes delaying a downlink channel monitoring by the CU-DU RTT in accordance with the delayed downlink channel monitoring window based at least in part on the RACH procedure being successful, wherein the downlink channel monitoring is delayed for an initial access in which the UE is in an idle mode, an RRC reestablishment, or during a handover in which an RRC reconfiguration message is transmitted in the MsgA.

In a seventh aspect, alone or in combination with one or more of the first through sixth aspects, the downlink channel monitoring is delayed by the CU-DU RTT after an end of a reception of a downlink shared channel transmission in the MsgB, or the downlink channel monitoring is delayed by the CU-DU RTT after an end of a reception of a success RAR in the MsgB.

In an eighth aspect, alone or in combination with one or more of the first through seventh aspects, the downlink channel monitoring is delayed by the CU-DU RTT after an end of a transmission of an ACK associated with a success RAR in the MsgB.

In a ninth aspect, alone or in combination with one or more of the first through eighth aspects, the uplink transmission is an RRC resume request message associated with an SDT, and the downlink transmission is an RRC release message.

In a tenth aspect, alone or in combination with one or more of the first through ninth aspects, process 800 includes delaying a downlink channel monitoring by a CU-DU RTT associated with the SDT, wherein the CU-DU RTT associated with the SDT is at least twice a time duration of a CU-DU RTT associated with a non-SDT.

In an eleventh aspect, alone or in combination with one or more of the first through tenth aspects, process 800 includes receiving, via a broadcast, a SIB that includes an indication of the CU-DU RTT associated with the SDT.

In a twelfth aspect, alone or in combination with one or more of the first through eleventh aspects, the downlink channel monitoring is delayed by the CU-DU RTT associated with the SDT after an end of a reception of a contention resolution identifier MAC-CE, or the downlink channel monitoring is delayed by the CU-DU RTT associated with the SDT after an end of a reception of a success RAR in a MsgB of a RACH procedure.

In a thirteenth aspect, alone or in combination with one or more of the first through twelfth aspects, the uplink transmission is a PUR based transmission, the downlink transmission is an L1 ACK, and a downlink channel monitoring for a downlink RRC message is delayed by the CU-DU RTT after an end of a reception of the L1 ACK in accordance with the delayed downlink channel monitoring window.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
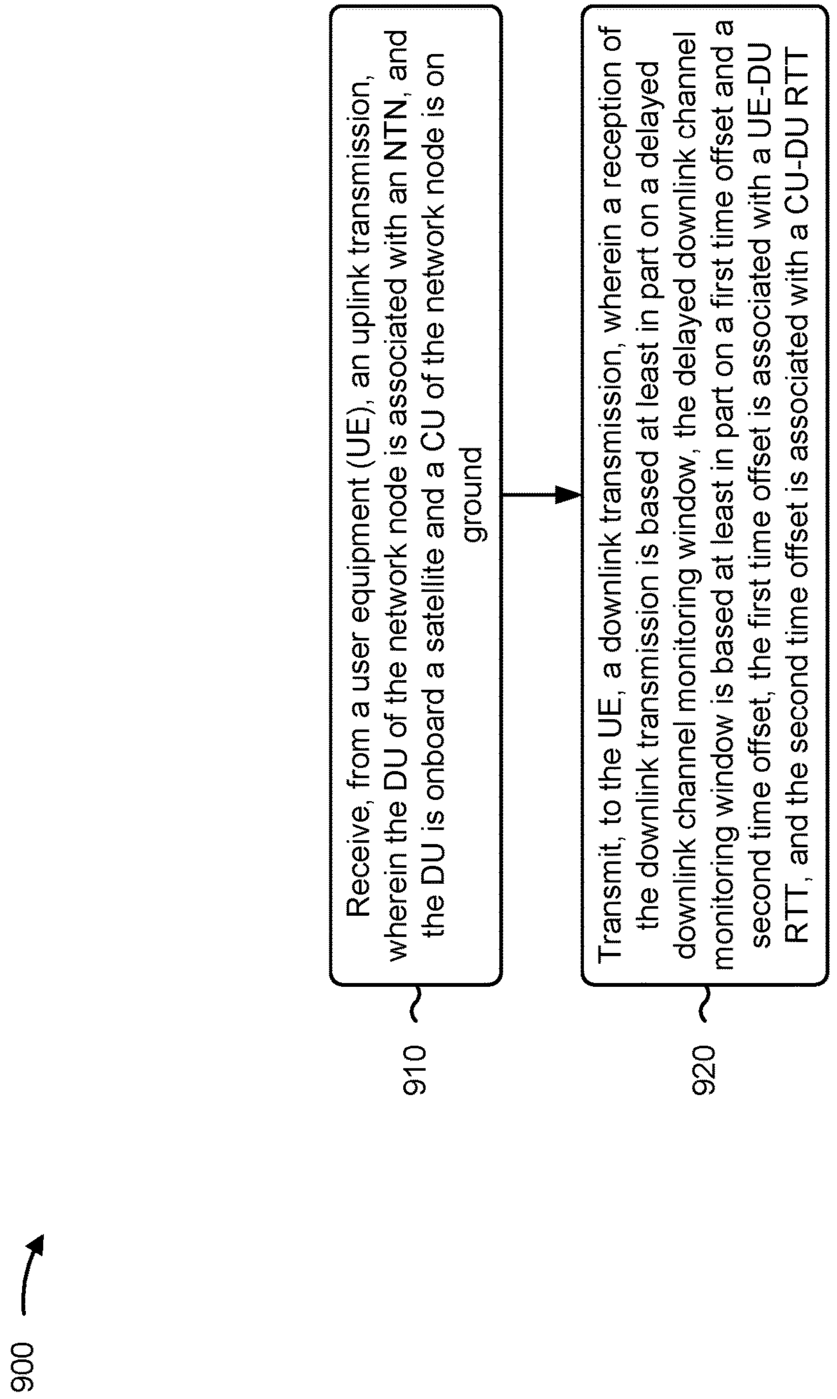

FIG. 9 is a diagram illustrating an example process 900 performed, for example, at a DU or an apparatus of a DU of a network node, in accordance with the present disclosure. Example process 900 is an example where the apparatus or the DU of the network node (e.g., network node 110) performs operations associated with delaying downlink channel monitoring in an NTN.

As shown in FIG. 9, in some aspects, process 900 may include receiving, from a UE, an uplink transmission, wherein the DU of the network node is associated with an NTN, and the DU is onboard a satellite and a CU of the network node is on ground (block 910). For example, the DU (e.g., using communication manager 150 and/or reception component 1102, depicted in FIG. 11) may receive, from a UE, an uplink transmission, wherein the DU of the network node is associated with an NTN, and the DU is onboard a satellite and a CU of the network node is on ground, as described above, for example, with reference to FIGS. 4, 5, and/or 7.

As further shown in FIG. 9, in some aspects, process 900 may include transmitting, to the UE, a downlink transmission, wherein a reception of the downlink transmission is based at least in part on a delayed downlink channel monitoring window, the delayed downlink channel monitoring window is based at least in part on a first time offset and a second time offset, the first time offset is associated with a UE-DU RTT, and the second time offset is associated with a CU-DU RTT (block 920). For example, the DU (e.g., using communication manager 150 and/or transmission component 1104, depicted in FIG. 11) may transmit, to the UE, a downlink transmission, wherein a reception of the downlink transmission is based at least in part on a delayed downlink channel monitoring window, the delayed downlink channel monitoring window is based at least in part on a first time offset and a second time offset, the first time offset is associated with a UE-DU RTT, and the second time offset is associated with a CU-DU RTT, as described above, for example, with reference to FIGS. 4, 5, and/or 7.

Process 900 may include additional aspects, such as any single aspect or any combination of aspects described below and/or in connection with one or more other processes described elsewhere herein.

In a first aspect, process 900 includes transmitting a SIB that includes an indication of the CU-DU RTT.

In a second aspect, alone or in combination with the first aspect, the uplink transmission is a Msg3 of a RACH procedure, and the downlink transmission is a Msg4 of the RACH procedure.

In a third aspect, alone or in combination with one or more of the first and second aspects, the uplink transmission is a MsgA of a RACH procedure, and the downlink transmission is a MsgB of the RACH procedure.

In a fourth aspect, alone or in combination with one or more of the first through third aspects, the uplink transmission is an RRC resume request message associated with an SDT, and the downlink transmission is an RRC release message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
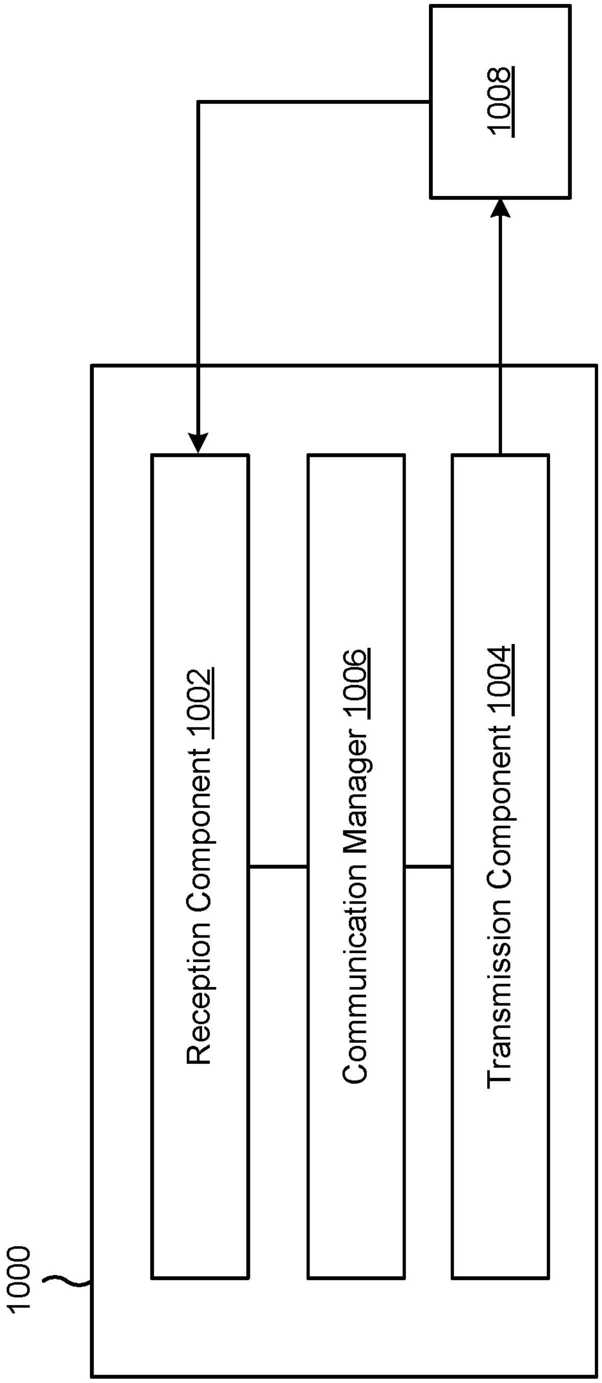
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit, to a DU of a network node associated with an NTN, an uplink transmission, wherein the DU is onboard a satellite and a CU of the network node is on ground. The reception component 1002 may receive, from the DU, a downlink transmission based at least in part on a delayed downlink channel monitoring window, wherein the delayed downlink channel monitoring window is based at least in part on a first time offset and a second time offset, the first time offset is associated with a UE-DU RTT, and the second time offset is associated with a CU-DU RTT.

The reception component 1002 may receive, via a broadcast, a SIB that includes an indication of the CU-DU RTT. The communication manager 1006 may delay a Msg4 RRC monitoring by the CU-DU RTT in accordance with the delayed downlink channel monitoring window, wherein the Msg4 RRC monitoring is delayed by the CU-DU RTT after an end of a reception of a contention resolution identifier MAC-CE, or the Msg4 RRC monitoring is delayed by the CU-DU RTT after an end of a transmission of an ACK associated with the contention resolution identifier MAC-CE.

The communication manager 1006 may delay a Msg4 RRC monitoring by a UE-CU RTT in accordance with the delayed downlink channel monitoring window, wherein the Msg4 RRC monitoring is delayed by the UE-CU RTT after an end of a Msg3 transmission, and the UE-CU RTT is the UE-DU RTT plus the CU-DU RTT. The communication manager 1006 may delay a downlink channel monitoring by the CU-DU RTT in accordance with the delayed downlink channel monitoring window based at least in part on the RACH procedure being successful, wherein the downlink channel monitoring is delayed for an initial access in which the UE is in an idle mode, a RRC reestablishment, or during a handover in which an RRC reconfiguration message is transmitted in the MsgA. The communication manager 1006 may delay a downlink channel monitoring by a CU-DU RTT associated with the SDT, wherein the CU-DU RTT associated with the SDT is at least twice a time duration of a CU-DU RTT associated with a non-SDT. The reception component 1002 may receive, via a broadcast, a SIB that includes an indication of the CU-DU RTT associated with the SDT.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
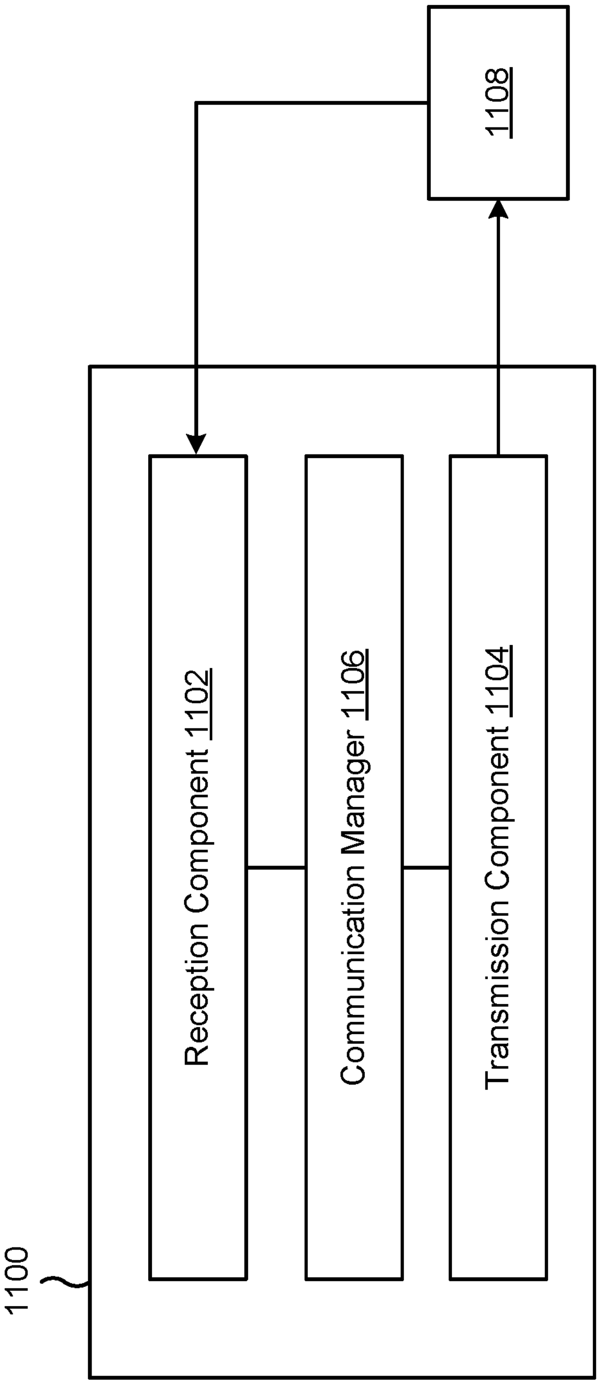

FIG. 11 is a diagram of an example apparatus 1100 for wireless communication, in accordance with the present disclosure. The apparatus 1100 may be a DU, or a DU may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the DU described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the DU described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the DU described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive, from a UE, an uplink transmission, wherein the DU of the network node is associated with an NTN, and the DU is onboard a satellite and a CU of the network node is on ground. The transmission component 1104 may transmit, to the UE, a downlink transmission, wherein a reception of the downlink transmission is based at least in part on a delayed downlink channel monitoring window, the delayed downlink channel monitoring window is based at least in part on a first time offset and a second time offset, the first time offset is associated with a UE-DU RTT, and the second time offset is associated with a CU-DU RTT. The transmission component 1104 may transmit a SIB that includes an indication of the CU-DU RTT.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting, to a distributed unit (DU) of a network node associated with a non-terrestrial network (NTN), an uplink transmission, wherein the DU is onboard a satellite and a central unit (CU) of the network node is on ground; and receiving, from the DU, a downlink transmission based at least in part on a delayed downlink channel monitoring window, wherein the delayed downlink channel monitoring window is based at least in part on a first time offset and a second time offset, the first time offset is associated with a UE-DU round-trip time (RTT), and the second time offset is associated with a CU-DU RTT.

Aspect 2: The method of Aspect 1, further comprising: receiving, via a broadcast, a system information block (SIB) that includes an indication of the CU-DU RTT.

Aspect 3: The method of any of Aspects 1-2, wherein the uplink transmission is a message 3 (Msg3) of a random access channel (RACH) procedure, and the downlink transmission is a message 4 (Msg4) of the RACH procedure.

Aspect 4: The method of Aspect 3, further comprising: delaying a Msg4 radio resource control (RRC) monitoring by the CU-DU RTT in accordance with the delayed downlink channel monitoring window, wherein: the Msg4 RRC monitoring is delayed by the CU-DU RTT after an end of a reception of a contention resolution identifier medium access control control element (MAC-CE), or the Msg4 RRC monitoring is delayed by the CU-DU RTT after an end of a transmission of an acknowledgement associated with the contention resolution identifier MAC-CE.

Aspect 5: The method of Aspect 3, further comprising: delaying a Msg4 radio resource control (RRC) monitoring by a UE-CU RTT in accordance with the delayed downlink channel monitoring window, wherein the Msg4 RRC monitoring is delayed by the UE-CU RTT after an end of a Msg3 transmission, and the UE-CU RTT is the UE-DU RTT plus the CU-DU RTT.

Aspect 6: The method of any of Aspects 1-5, wherein the uplink transmission is a message A (MsgA) of a random access channel (RACH) procedure, and the downlink transmission is a message B (MsgB) of the RACH procedure.

Aspect 7: The method of Aspect 6, further comprising: delaying a downlink channel monitoring by the CU-DU RTT in accordance with the delayed downlink channel monitoring window based at least in part on the RACH procedure being successful, wherein the downlink channel monitoring is delayed for an initial access in which the UE is in an idle mode, a radio resource control (RRC) reestablishment, or during a handover in which an RRC reconfiguration message is transmitted in the MsgA.

Aspect 8: The method of Aspect 6, wherein: the downlink channel monitoring is delayed by the CU-DU RTT after an end of a reception of a downlink shared channel transmission in the MsgB, or the downlink channel monitoring is delayed by the CU-DU RTT after an end of a reception of a success random access response (RAR) in the MsgB.

Aspect 9: The method of Aspect 6, wherein: the downlink channel monitoring is delayed by the CU-DU RTT after an end of a transmission of an acknowledgement associated with a success random access response (RAR) in the MsgB.

Aspect 10: The method of any of Aspects 1-9, wherein the uplink transmission is a radio resource control (RRC) resume request message associated with a small data transmission (SDT), and the downlink transmission is an RRC release message.

Aspect 11: The method of Aspect 10, further comprising: delaying a downlink channel monitoring by a CU-DU RTT associated with the SDT, wherein the CU-DU RTT associated with the SDT is at least twice a time duration of a CU-DU RTT associated with a non-SDT.

Aspect 12: The method of Aspect 11, further comprising: receiving, via a broadcast, a system information block (SIB) that includes an indication of the CU-DU RTT associated with the SDT.

Aspect 13: The method of Aspect 11, wherein: the downlink channel monitoring is delayed by the CU-DU RTT associated with the SDT after an end of a reception of a contention resolution identifier medium access control control element (MAC-CE), or the downlink channel monitoring is delayed by the CU-DU RTT associated with the SDT after an end of a reception of a success random access response (RAR) in a message B (MsgB) of a random access channel (RACH) procedure.

Aspect 14: The method of any of Aspects 1-13, wherein the uplink transmission is a preconfigured uplink resource (PUR) based transmission, the downlink transmission is a layer 1 (L1) acknowledgement (ACK), and a downlink channel monitoring for a downlink radio resource control (RRC) message is delayed by the CU-DU RTT after an end of a reception of the L1 ACK in accordance with the delayed downlink channel monitoring window.

Aspect 15: A method of wireless communication performed by a distributed unit (DU) of a network node, comprising: receiving, from a user equipment (UE), an uplink transmission, wherein the DU of the network node is associated with a non-terrestrial network (NTN), and the DU is onboard a satellite and a central unit (CU) of the network node is on ground; and transmitting, to the UE, a downlink transmission, wherein a reception of the downlink transmission is based at least in part on a delayed downlink channel monitoring window, the delayed downlink channel monitoring window is based at least in part on a first time offset and a second time offset, the first time offset is associated with a UE-DU round-trip time (RTT), and the second time offset is associated with a CU-DU RTT.

Aspect 16: The method of Aspect 15, further comprising: transmitting a system information block (SIB) that includes an indication of the CU-DU RTT.

Aspect 17: The method of any of Aspects 15-16, wherein the uplink transmission is a message 3 (Msg3) of a random access channel (RACH) procedure, and the downlink transmission is a message 4 (Msg4) of the RACH procedure.

Aspect 18: The method of any of Aspects 15-17, wherein the uplink transmission is a message A (MsgA) of a random access channel (RACH) procedure, and the downlink transmission is a message B (MsgB) of the RACH procedure.

Aspect 19: The method of any of Aspects 15-18, wherein the uplink transmission is a radio resource control (RRC) resume request message associated with a small data transmission (SDT), and the downlink transmission is an RRC release message.

Aspect 20: A method of wireless communication performed by a user equipment (UE), comprising: transmitting, to a distributed unit (DU) of a network node associated with a non-terrestrial network (NTN), a message 3 (Msg3) during a random access channel (RACH) procedure, wherein the DU is onboard a satellite and a central unit (CU) of the network node is on ground; receiving, from the DU, a contention resolution identifier medium access control control element (MAC-CE); and starting a downlink channel monitoring after a reception of the contention resolution identifier MAC-CE or at an end of an acknowledgement transmission, wherein the downlink channel monitoring is associated with a selected search space periodicity or a selected discontinuous reception (DRX) cycle to reduce power consumption at the UE, and the downlink channel monitoring is not associated with a CU-DU round-trip time (RTT).

Aspect 21: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-14 and 20.

Aspect 22: An apparatus for wireless communication at a device, the apparatus comprising one or more memories and one or more processors coupled to the one or more memories, the one or more processors configured to cause the device to perform the method of one or more of Aspects 1-14 and 20.

Aspect 23: An apparatus for wireless communication, the apparatus comprising at least one means for performing the method of one or more of Aspects 1-14 and 20.

Aspect 24: A non-transitory computer-readable medium storing code for wireless communication, the code comprising instructions executable by one or more processors to perform the method of one or more of Aspects 1-14 and 20.

Aspect 25: A non-transitory computer-readable medium storing a set of instructions for wireless communication, the set of instructions comprising one or more instructions that, when executed by one or more processors of a device, cause the device to perform the method of one or more of Aspects 1-14 and 20.

Aspect 26: A device for wireless communication, the device comprising a processing system that includes one or more processors and one or more memories coupled with the one or more processors, the processing system configured to cause the device to perform the method of one or more of Aspects 1-14 and 20.

Aspect 27: An apparatus for wireless communication at a device, the apparatus comprising one or more memories and one or more processors coupled to the one or more memories, the one or more processors individually or collectively configured to cause the device to perform the method of one or more of Aspects 1-14 and 20.

Aspect 28: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 15-19.

Aspect 29: An apparatus for wireless communication at a device, the apparatus comprising one or more memories and one or more processors coupled to the one or more memories, the one or more processors configured to cause the device to perform the method of one or more of Aspects 15-19.

Aspect 30: An apparatus for wireless communication, the apparatus comprising at least one means for performing the method of one or more of Aspects 15-19.

Aspect 31: A non-transitory computer-readable medium storing code for wireless communication, the code comprising instructions executable by one or more processors to perform the method of one or more of Aspects 15-19.

Aspect 32: A non-transitory computer-readable medium storing a set of instructions for wireless communication, the set of instructions comprising one or more instructions that, when executed by one or more processors of a device, cause the device to perform the method of one or more of Aspects 15-19.

Aspect 33: A device for wireless communication, the device comprising a processing system that includes one or more processors and one or more memories coupled with the one or more processors, the processing system configured to cause the device to perform the method of one or more of Aspects 15-19.

Aspect 34: An apparatus for wireless communication at a device, the apparatus comprising one or more memories and one or more processors coupled to the one or more memories, the one or more processors individually or collectively configured to cause the device to perform the method of one or more of Aspects 15-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
transmit, via one or more antennas, to a distributed unit (DU) of a network node associated with a non-terrestrial network (NTN), an uplink transmission, wherein the DU is onboard a satellite and a central unit (CU) of the network node is on ground; and
receive, via the one or more antennas, from the DU, a downlink transmission based at least in part on a delayed downlink channel monitoring window,
wherein, for a non-small data transmission (non-SDT), the delayed downlink channel monitoring window is based at least in part on a first time offset and a second time offset, the first time offset is associated with a UE-DU round-trip time (RTT), and the second time offset is associated with a CU-DU RTT, and
wherein, for a small data transmission (SDT), the delayed downlink channel monitoring window is based at least in part on a CU-DU RTT that is at least twice the CU-DU RTT for non-SDT.

2. The apparatus of claim 1, wherein the one or more processors are further configured to cause the UE to:
receive, via a broadcast, a system information block (SIB) that includes an indication of the CU-DU RTT.

3. The apparatus of claim 1, wherein the uplink transmission is a message 3 (Msg3) of a random access channel (RACH) procedure, and the downlink transmission is a message 4 (Msg4) of the RACH procedure.

4. The apparatus of claim 3, wherein the one or more processors are further configured to cause the UE to:
delay a Msg4 radio resource control (RRC) monitoring by the CU-DU RTT in accordance with the delayed downlink channel monitoring window, wherein:
the Msg4 RRC monitoring is delayed by the CU-DU RTT after an end of a reception of a contention resolution identifier medium access control control element (MAC-CE), or
the Msg4 RRC monitoring is delayed by the CU-DU RTT after an end of a transmission of an acknowledgement associated with the contention resolution identifier MAC-CE.

5. The apparatus of claim 3, wherein the one or more processors are further configured to cause the UE to:
delay a Msg4 radio resource control (RRC) monitoring by a UE-CU RTT in accordance with the delayed downlink channel monitoring window, wherein the Msg4 RRC monitoring is delayed by the UE-CU RTT after an end of a Msg3 transmission, and the UE-CU RTT is the UE-DU RTT plus the CU-DU RTT.

6. The apparatus of claim 1, wherein the uplink transmission is a message A (MsgA) of a random access channel (RACH) procedure, and the downlink transmission is a message B (MsgB) of the RACH procedure.

7. The apparatus of claim 6, wherein the one or more processors are further configured to cause the UE to:
delay a downlink channel monitoring by the CU-DU RTT in accordance with the delayed downlink channel monitoring window based at least in part on the RACH procedure being successful, wherein the downlink channel monitoring is delayed for an initial access in which the UE is in an idle mode, a radio resource control (RRC) reestablishment, or during a handover in which an RRC reconfiguration message is transmitted in the MsgA.

8. The apparatus of claim 6, wherein:
the downlink channel monitoring is delayed by the CU-DU RTT after an end of a reception of a downlink shared channel transmission in the MsgB, or
the downlink channel monitoring is delayed by the CU-DU RTT after an end of a reception of a success random access response (RAR) in the MsgB.

9. The apparatus of claim 6, wherein:
the downlink channel monitoring is delayed by the CU-DU RTT after an end of a transmission of an acknowledgement associated with a success random access response (RAR) in the MsgB.

10. The apparatus of claim 1, wherein the uplink transmission is a radio resource control (RRC) resume request message associated with a SDT, and the downlink transmission is an RRC release message.

11. The apparatus of claim 10, wherein the one or more processors are further configured to cause the UE to:
delay a downlink channel monitoring by a CU-DU RTT associated with the SDT.

12. The apparatus of claim 11, wherein the one or more processors are further configured to cause the UE to:
receive, via a broadcast, a system information block (SIB) that includes an indication of the CU-DU RTT associated with the SDT.

13. The apparatus of claim 11, wherein:
the downlink channel monitoring is delayed by the CU-DU RTT associated with the SDT after an end of a reception of a contention resolution identifier medium access control control element (MAC-CE), or
the downlink channel monitoring is delayed by the CU-DU RTT associated with the SDT after an end of a reception of a success random access response (RAR) in a message B (MsgB) of a random access channel (RACH) procedure.

14. The apparatus of claim 1, wherein the uplink transmission is a preconfigured uplink resource (PUR) based transmission, the downlink transmission is a layer 1 (L1) acknowledgement (ACK), and a downlink channel monitoring for a downlink radio resource control (RRC) message is delayed by the CU-DU RTT after an end of a reception of the L1 ACK in accordance with the delayed downlink channel monitoring window.

15. An apparatus for wireless communication at a distributed unit (DU) of a network node, comprising:

one or more memories; and one or more processors, coupled to the one or more memories, configured to cause the DU of the network node to:

receive, from a user equipment (UE), an uplink transmission, wherein the DU of the network node is associated with a non-terrestrial network (NTN), and the DU is onboard a satellite and a central unit (CU) of the network node is on ground; and transmit, to the UE, a downlink transmission, wherein a reception of the downlink transmission is based at least in part on a delayed downlink channel monitoring window, wherein, for a non-small data transmission (non-SDT), the delayed downlink channel monitoring window is based at least in part on a first time offset and a second time offset, the first time offset is associated with a UE-DU round-trip time (RTT), and the second time offset is associated with a CU-DU RTT, and wherein, for a small data transmission (SDT), the delayed downlink channel monitoring window is based at least in part on a CU-DU RTT that is at least twice the CU-DU RTT for non-SDT.

16. The apparatus of claim 15, wherein the one or more processors are further configured to cause the DU of the network node to:

transmit a system information block (SIB) that includes an indication of the CU-DU RTT.

17. The apparatus of claim 15, wherein the uplink transmission is a message 3 (Msg3) of a random access channel (RACH) procedure, and the downlink transmission is a message 4 (Msg4) of the RACH procedure.

18. The apparatus of claim 15, wherein the uplink transmission is a message A (MsgA) of a random access channel (RACH) procedure, and the downlink transmission is a message B (MsgB) of the RACH procedure.

19. The apparatus of claim 15, wherein the uplink transmission is a radio resource control (RRC) resume request message associated with a SDT, and the downlink transmission is an RRC release message.

20. A method of wireless communication performed by a user equipment (UE), comprising:

transmitting, to a distributed unit (DU) of a network node associated with a non-terrestrial network (NTN), an uplink transmission, wherein the DU is onboard a satellite and a central unit (CU) of the network node is on ground; and receiving, from the DU, a downlink transmission based at least in part on a delayed downlink channel monitoring window, wherein, for non-small data transmission (non-SDT), the delayed downlink channel monitoring window is based at least in part on a first time offset and a second time offset, the first time offset is associated with a UE-DU round-trip time (RTT), and the second time offset is associated with a CU-DU RTT, and wherein, for a small data transmission (SDT), the delayed downlink channel monitoring window is based at least in part on a CU-DU RTT that is at least twice the CU-DU RTT for a non-SDT.

21. The method of claim 20, wherein the uplink transmission is a message 3 (Msg3) of a random access channel (RACH) procedure, and the downlink transmission is a message 4 (Msg4) of the RACH procedure.

22. The method of claim 21, further comprising:

delaying a Msg4 radio resource control (RRC) monitoring by the CU-DU RTT in accordance with the delayed downlink channel monitoring window, wherein:

the Msg4 RRC monitoring is delayed by the CU-DU RTT after an end of a reception of a contention resolution identifier medium access control control element (MAC-CE), or the Msg4 RRC monitoring is delayed by the CU-DU RTT after an end of a transmission of an acknowledgement associated with the contention resolution identifier MAC-CE.

23. The method of claim 21, further comprising:

delaying a Msg4 radio resource control (RRC) monitoring by a UE-CU RTT in accordance with the delayed downlink channel monitoring window, wherein the Msg4 RRC monitoring is delayed by the UE-CU RTT after an end of a Msg3 transmission, and the UE-CU RTT is the UE-DU RTT plus the CU-DU RTT.

24. The method of claim 20, wherein the uplink transmission is a message A (MsgA) of a random access channel (RACH) procedure, and the downlink transmission is a message B (MsgB) of the RACH procedure.

25. The method of claim 24, further comprising:

delaying a downlink channel monitoring by the CU-DU RTT in accordance with the delayed downlink channel monitoring window based at least in part on the RACH procedure being successful, wherein the downlink channel monitoring is delayed for an initial access in which the UE is in an idle mode, a radio resource control (RRC) reestablishment, or during a handover in which an RRC reconfiguration message is transmitted in the MsgA.

26. The method of claim 24, wherein:

the downlink channel monitoring is delayed by the CU-DU RTT after an end of a reception of a downlink shared channel transmission in the MsgB, or the downlink channel monitoring is delayed by the CU-DU RTT after an end of a reception of a success random access response (RAR) in the MsgB.

27. The method of claim 24, wherein:

the downlink channel monitoring is delayed by the CU-DU RTT after an end of a transmission of an acknowledgement associated with a success random access response (RAR) in the MsgB.

28. A method of wireless communication performed by a distributed unit (DU) of a network node, comprising:

receiving, from a user equipment (UE), an uplink transmission, wherein the DU of the network node is associated with a non-terrestrial network (NTN), and the DU is onboard a satellite and a central unit (CU) of the network node is on ground; and transmitting, to the UE, a downlink transmission, wherein a reception of the downlink transmission is based at least in part on a delayed downlink channel monitoring window, wherein, for a non-small data transmission (non-SDT), the delayed downlink channel monitoring window is based at least in part on a first time offset and a second time offset, the first time offset is associated with a UE-DU round-trip time (RTT), and the second time offset is associated with a CU-DU RTT, and wherein, for a small data transmission (SDT), the delayed downlink channel monitoring window is based at least in part on a CU-DU RTT that is at least twice the CU-DU RTT for non-SDT.

29. The method of claim 28, further comprising:

transmitting a system information block (SIB) that includes an indication of the CU-DU RTT.

30. The method of claim 28, wherein:

the uplink transmission is a message 3 (Msg3) of a random access channel (RACH) procedure, and the downlink transmission is a message 4 (Msg4) of the RACH procedure;

the uplink transmission is a message A (MsgA) of the RACH procedure, and the downlink transmission is a message B (MsgB) of the RACH procedure; or the uplink transmission is a radio resource control (RRC) resume request message associated with a SDT, and the downlink transmission is an RRC release message.

* * * * *